United States Patent [19]

Kaiser et al.

[11] Patent Number: 5,177,761
[45] Date of Patent: Jan. 5, 1993

[54] GAS DISCHARGE TUBE HAVING REFRACTORY CERAMIC COATED BORE DISC FOR ION LASER

[75] Inventors: Jeffrey L. Kaiser, Mountain View; Shinan-Chur S. Sheng, Saratoga, both of Calif.

[73] Assignee: Spectra-Physics Lasers, Inc., Mountain View, Calif.

[21] Appl. No.: 778,499

[22] Filed: Oct. 17, 1991

[51] Int. Cl.⁵ .............................................. H01S 3/03
[52] U.S. Cl. ........................................ 372/61; 372/62; 372/55; 372/36
[58] Field of Search ....................... 372/61, 62, 55, 58, 372/64, 65, 34, 36, 30, 103

[56] References Cited

U.S. PATENT DOCUMENTS

| | | | |
|---|---|---|---|
| 4,685,109 | 8/1987 | Carlson et al. | 372/61 |
| 4,719,638 | 1/1988 | Carlson et al. | 372/62 |
| 4,736,379 | 4/1988 | Barker et al. | 372/61 |
| 4,752,936 | 6/1988 | Gerhardt | 372/61 X |
| 4,756,001 | 7/1988 | Heynisch et al. | 372/61 |
| 4,864,582 | 9/1989 | Barth et al. | 372/61 |
| 4,912,719 | 3/1990 | Kanamoto et al. | 372/61 |
| 4,974,228 | 11/1990 | Petersen | 372/61 |
| 5,091,914 | 2/1992 | Maeda et al. | 372/61 |
| 5,124,998 | 6/1992 | Arrigoni et al. | 372/61 |

FOREIGN PATENT DOCUMENTS

| | | | |
|---|---|---|---|
| 55-65485 | 5/1980 | Japan | 372/62 |
| 55-108787 | 8/1980 | Japan | 372/62 |
| 61-180488 | 8/1986 | Japan | 372/62 |

Primary Examiner—Brian Healy
Attorney, Agent, or Firm—Fliesler, Dubb, Meyer & Lovejoy

[57] ABSTRACT

A heat conducting structure in a discharge tube of an ion laser, that has high resistance to erosion due to sputtering comprises a discharge limiting member having an inner aperture, and a thin film of refractory ceramic coating areas near the inner aperture. The thin film of ceramic does not significantly retard heat flow out of the discharge into the heat conducting structure, but significantly increases resistance of the heat conduction structure to sputtering.

14 Claims, 1 Drawing Sheet

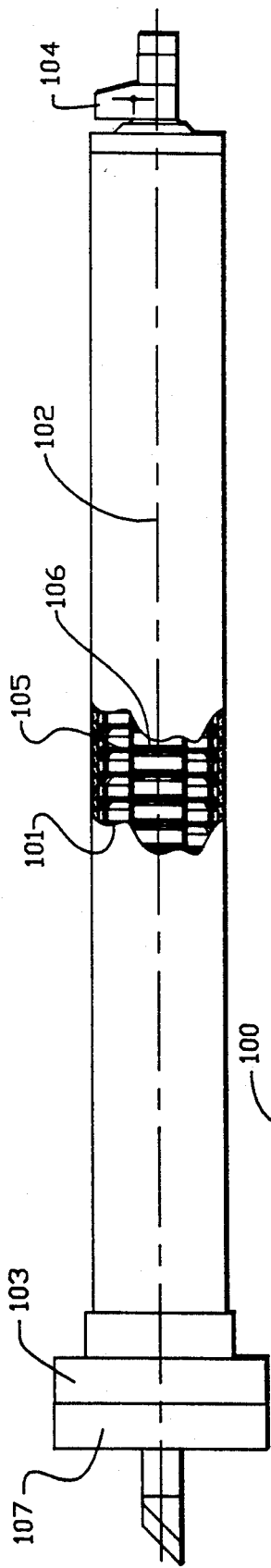
FIG.—1
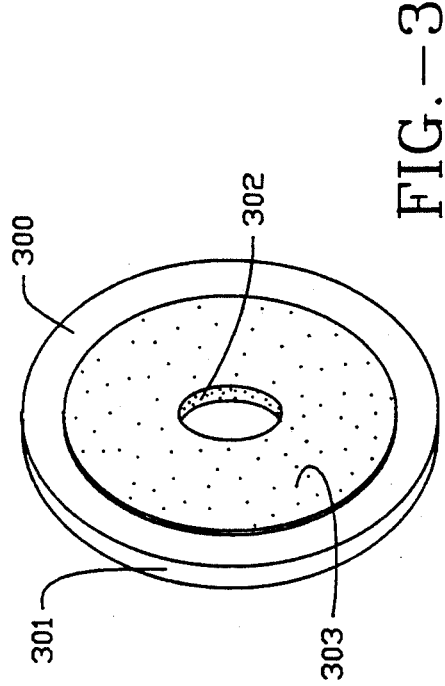
FIG.—3
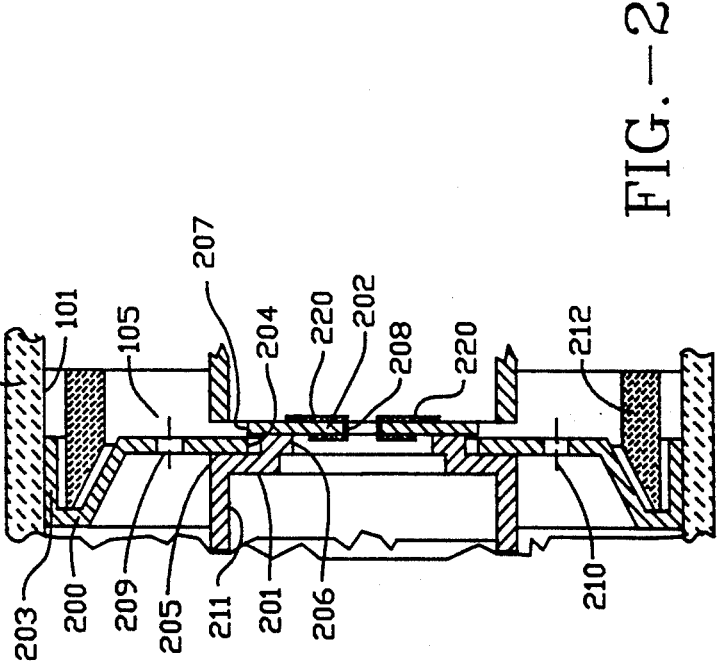
FIG.—2

GAS DISCHARGE TUBE HAVING REFRACTORY CERAMIC COATED BORE DISC FOR ION LASER

FIELD OF THE INVENTION

The present application relates to gas discharge tubes used in ion lasers; and in particular, to heat conducting structures for conducting heat out of the bore of a gas discharge tube.

BACKGROUND OF THE INVENTION

Gas ion lasers are characterized by a gas discharge tube which includes an anode and a cathode defining an arc discharge within the tube. The arc discharge induces significant amount of heat which must be dissipated out of the bore of the gas discharge tube. A common method for controlling the temperature within the discharge tube is to provide a plurality of heat conduction structures inside the vacuum envelope of the discharge tube which consist basically of discs having an inside aperture. The inside aperture of the disc limits the gas discharge to a bore typically along the center of the tube. Heat is radiated into the heat conduction structure and out to the inside surface of the vacuum envelope. The outside surface of the vacuum envelope is cooled to remove the heat. This basic structure is described, for example, in U.S. Pat. No. 4,719,638, entitled DISCHARGE TUBE FOR A GAS LASER, by Carlson, et al., issued Jan. 12, 1988.

A variety of alternative discharge tube designs exist, many of which include heat conduction structures within the vacuum envelope of the tube. These systems are characterized by erosion of the heat conduction structure due to the sputtering effect of high energy ions from the gas discharge. In gas discharge tubes, such as described in Carlson, et al., and such as used in the Spectra-Physics Model 2040 argon ion laser, manufactured by Spectra-Physics Lasers, Inc., in Mountain View, Calif., the heat conducting structures comprise a web member, a shield member and an inside bore disc. The web member is brazed to an inside surface of a ceramic cylinder serving as the vacuum envelope of the tube and includes a number of holes which establishes a gas bypass path adjacent the inside surface of the cylinder. The shield member establishes a shield between the gas bypass path and the arc through the discharge tube. The inside bore disc is manufactured of a sputter resistant metal such as tungsten, and has an inside aperture which limits the gas discharge and defines the outside diameter of the bore.

The aperture size is designed to optimize the performance of the laser, in combination with factors like the length of the discharge tube, the power limitation, and beam quality. A small diameter aperture increases the current density within the bore and thereby laser efficiency. However, a small diameter aperture suffers very high erosion rates because of the increased concentration of higher energy ions in the discharge which increases the sputtering rate.

Therefore, it is desirable to provide a heat conduction structure which allows optimizing the design of a gas discharge tube for ion lasers, while increasing the resistance of the heat conduction structure to erosion by sputtering.

SUMMARY OF THE INVENTION

The present invention provides a heat conducting structure for use in a discharge tube of an ion laser, that has high resistance to erosion due to sputtering. According to the present invention, the heat conducting structures comprise a discharge limiting member having an inner aperture, and a thin film of refractory ceramic coating the inner aperture. The thin film of ceramic does not significantly retard heat flow out of the discharge into the heat conducting structure, but significantly increases resistance of the heat conduction structure to sputtering. Thereby the useable life of the discharge tube is increased. Also, the designer is able to use higher energy discharges or smaller diameter bores for a given expected useable life.

Accordingly, the present invention can be characterized as a gas discharge tube for an ion laser which comprises a vacuum envelope having an axis, and an inside surface. A plurality of heat conducting structures are secured to the inside surface of the vacuum envelope generally perpendicular to the axis. The heat conducting structures comprise a discharge limiting member having an inner aperture limiting discharge to a bore along the axis of the vacuum envelope, and a thin film of refractory ceramic coating the inner aperture.

The heat conducting structure may further include a web member and a shield member. The web member is secured to the inside surface of the vacuum envelope. The web member includes a plurality of passages providing a gas bypass path near the inside surface of the vacuum envelope. The shield member is secured to the web member, and includes a shield for isolating discharge in the bore from the gas bypass path. The discharge limiting member is, in turn, secured to the shield member and limits the discharge within the bore. At least the inside aperture of the discharge limiting member is coated with refractory ceramic, and preferably a majority of the areas on the heat conduction structure which are exposed to high energy ions from the gas discharge in significant levels are coated with the refractory ceramic.

Heat conducting structures can be implemented with a single piece of metal, or individual members of the structures may be constructed of materials specifically designed for the function of the individual members.

Accordingly, the heat conduction structure according to the present invention allows designers of ion lasers greater latitude in the construction of discharge tubes for lasers, and particularly, in the specification of the aperture size confining the gas discharge. Further, existing ion laser designs may achieve increased usable lifetime because of reduced sputtering on the heat conduction structures in the bore region.

Other aspects and advantages of the present invention can be seen upon review of the figures, the detailed description, and the claims which follow.

BRIEF DESCRIPTION OF THE FIGURES

FIG. 1 is a cut-away view of a gas discharge tube according to the present invention.

FIG. 2 is a blowup of a heat conduction structure according to the present invention.

FIG. 3 is a drawing of a discharge limiting member according to the present invention.

DESCRIPTION OF THE PREFERRED EMBODIMENTS

A detailed description of preferred embodiments of the present invention is provided with respect to the figures.

FIG. 1 illustrates a gas discharge tube according to the present invention. The gas discharge tube consists of a cylindrical ceramic tube 100 forming a vacuum envelope having an inside surface 101 and an axis 102. Of course, vacuum envelopes for discharge tubes may be made of other materials and in other shapes. A fitting 103 is secured to a first end of the tube 100 at which a cathode structure 107 is mounted. At the second end of the tube 100, and anode structure 104 is secured. Between the anode structure 104 and the cathode structure 107, a gas discharge path is established through a bore along the axis 102 of the tube. Spaced along the length of the tube 100 are a plurality of heat conduction structures 105, also known as bore segments. The heat conduction structures 105 include a discharge limiting member 106 which defines an inside aperture of the heat conduction structure 105. The inside aperture of the heat conduction structure 105 limits gas discharge to a bore along the axis 102 in the tube 100 and defines a bore diameter for the tube.

The discharge tube 100 is designed for incorporation into a laser such as the Spectra-Physics model 2040 ion laser, manufactured by Spectra-Physics Lasers, Inc., of Mountain View, Calif. Those skilled in the art will recognize that a cooling fluid is flowed in contact with the outside surface of the tube 100 to remove heat which is drawn out of the discharge tube by the heat conduction structures 105. Furthermore, this discharge tube 100 provides a gain medium within a laser resonant cavity.

FIG. 2 is a blowup of the heat conduction structures within the gas discharge tube 100 according the present invention. The heat conduction structures, generally 105, consist of a web member 200, a shield member 201, and a discharge limiting member 202. The web member 200 has an outside perimeter 203, and an inside perimeter 204. The shield member 201 has an outside perimeter 205 and an inside perimeter 206. Similarly, the discharge limiting member 202 has an outside perimeter 207 and an inside perimeter 208.

The web member 200 is secured to the inside surface 101 of the gas discharge tube 100 at its outside perimeter 203. It includes a plurality of passages, such as passages 209, 210, distributed radially about the web. The passages, 209, 210, provide a gas bypass path along the length of the discharge tube to aid maintaining a constant gas pressure along the length of the tube.

The shield member 201 is secured near its outside perimeter 205 to the web member 200 in a region near the inside perimeter 204 of the web member 200. Similarly, the shield member 201 is secured near its inside perimeter 206 to the discharge limiting member 202 in a region near the outside perimeter 207 of the discharge limiting member 202. The shield member 201 includes shield 211, which shields the gas bypass path from the gas discharge.

The discharge limiting member 202 serves to limit the gas discharge within the region of the axis 102. Thus, the inside perimeter 208 of the discharge limiting member 202 defines an inner aperture, which in turn defines the outside diameter of the bore for the discharge. The discharge limiting member 202 is highly exposed to high energy ions in the discharge. Therefore, it is typically manufactured using a sputter resistant material such as tungsten, while the shield member 201 and the web member 200 are typically manufactured using copper.

A plurality of ceramic spacers 212 are enclosed between the heat conduction structures 105, as a manufacturing aid to establish equal spacing between the heat conduction structures 105 along the length of the bore.

As illustrated more clearly below, the discharge limiting member 202 includes a thin film of refractory ceramic 220 coating the inner aperture and the majority of the areas on the discharge limiting member which are exposed to the gas discharge in significant levels.

The web member 200, shield member 201, and discharge limiting member 202 are secured to one another by brazing with well known techniques. Alternatively, according to the present invention, the web member, shield member, and discharge limiting member may all be manufactured out of a single piece of metal. Due to the increased resistivity to sputtering provided by the thin film of refractory ceramic around the inner aperture, metals having lower sputter resistance, such as copper, may be used for the entire structure. Alternatively, the web member and shield member may consist of one or more metal pieces bonded, or formed as a unit, to form an outside member of the structure.

FIG. 3 is a perspective view of the discharge limiting member according to one embodiment of the present invention. FIG. 3 shows a washer-shaped disc 300 having an outside perimeter 301 and an inside perimeter 302. The inside perimeter 302 defines the aperture of the heat conduction structure as discussed above with respect to FIG. 2. A thin film refractory ceramic 303 coats the inside perimeter 302 and a majority of the areas on the washer-shaped disc 300 that are exposed at significant levels to high energy ions from gas discharge inside the bore. Thus, the ceramic 303 coats portions of both faces of the washer-shaped disc 300 as well as the inside perimeter 302.

According to one embodiment, the washer-shaped disc 300 consists of tungsten. The thin film ceramic coating consists of alumina deposited by a plasma spray process to a thickness of approximately 3 mils. Tungsten and alumina were chosen because these materials have similar coefficients of thermal expansion, and alumina has a greater resistance to sputtering than tungsten. The thickness of the thin film is chosen so that it has sufficient structural strength to withstand any mismatch in thermal expansion while bonding to the underlying metal, yet provides low resistance to conduction of heat into the heat conduction structure from the gas discharge.

Thus, the thin ceramic coating on the heat discharge structure confers the erosion resistance of a refractory ceramic to the good thermal conductivity properties and potentially low thermal expansion characteristics of a metal.

The choice of metal substrate-ceramic coating pair is based on thermal expansion matching. Also, the ceramic must have higher sputter resistance than the metal. As mentioned above, tungsten and alumina provide a suitable match, and bonding between the tungsten and alumina is sufficient for many applications when the alumina is applied by a plasma arc spray.

Other ceramics having a high sputter resistance which are suitable for application in the present invention with metals having matching thermal expansion characteristics include high melting point, low vapor pressure metal oxides, such as beryllium oxide, hafnia, thoria, zirconia, and titania. Also, silicon carbide, diamond, and other refractory ceramics will provide sputter resistance to heat conduction structures according to the present invention. Other metals that may be suitable in addition to tungsten and copper include molybdenum, iron, nickel, and alloys thereof, including alloys with other metals.

The bonding and deposition methods for applying ceramics to these metals include plasma spray, paint-on slurries, vapor deposition, sputtering, and evaporative deposition.

In order to improve the matching between ceramics having high sputter resistance and metals that are desired to be used for the heat conduction structure, a variety of techniques may be applied. For instance, an intermediate material may be applied to the heat conduction structure such as a brazing alloy, a reactive metal, or metals of intermediate thermal expansion between the ceramic and the base material.

Accordingly, the present invention provides a heat conduction structure for a discharge tube in an ion laser with very high resistance to sputtering. This improves the lifetime of the ion laser, and increases the flexibility for the designers of ion lasers to provide small aperture discharge paths.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A gas discharge tube for an ion laser, comprising:
a vacuum envelope having an axis and an inside surface;
a plurality of heat conducting structures secured to the inside surface of the vacuum envelope spaced along the axis, for conducting heat away from the axis;
wherein heat conducting structures in the plurality comprise a discharge limiting member having an inner aperture limiting gas discharge to a bore along the axis of the vacuum envelope and a thin film of refractory ceramic coating a portion of the discharge limiting member near the inner aperture.

2. The gas discharge tube of claim 1, wherein the heat conducting structures further comprise:
an outside member having an outside perimeter and an inside perimeter, secured at its outside perimeter to the inside surface of the vacuum envelope and near its inside perimeter to the discharge limiting member.

3. The gas discharge tube of claim 1, wherein the discharge limiting member comprises tungsten, and the ceramic comprises alumina.

4. The gas discharge tube of claim 1, wherein the thin film of refractory ceramic covers a majority of areas on the surface the discharge limiting member that are exposed to gas discharge in the bore.

5. The gas discharge tube of claim 1, wherein the heat conduction structure further includes a shield member and a web member;
the web member having an outside perimeter and an inside perimeter, secured at its outside perimeter to the inside surface of the vacuum envelope and near its inside perimeter to the shield member, and having a plurality of passages providing a gas bypass path near the inside surface of the vacuum envelope;
the shield member having an outside perimeter and an inside perimeter, secured near its outside perimeter to the web member and near its inside perimeter to the discharge limiting member, and having a shield for isolating discharge in the bore from the gas bypass path through the web member.

6. The gas discharge tube of claim 1, wherein at least one of the heat conducting structures in the plurality consists of a single piece of metal having the thin film of refractory ceramic coating a portion of the discharge limiting member near the inner aperture.

7. A heat conducting structure for conducting heat out of a gas discharge tube with an inside surface and a discharge path, comprising:
a discharge limiting member having an inner aperture for limiting gas discharge along the gas discharge path;
a thin film of refractory ceramic coating the inner aperture of the discharge limiting member; and
an outside member having an outside perimeter and an inside perimeter, adapted to be secured at its outside perimeter to the inside surface of the tube and near its inside perimeter to the discharge limiting member.

8. The heat conducting structure of claim 7, wherein the outside member comprises a shield member and a web member;
the web member having an outside perimeter and an inside perimeter, adapted to be secured at its outside perimeter to the inside surface of the tube and near its inside perimeter to the shield member, and having a plurality of passages providing a gas bypass path near the inside surface of the tube;
the shield member having an outside perimeter and an inside perimeter, secured near its outside perimeter to the web member and near its inside perimeter to the discharge limiting member, and having a shield for isolating the discharge path from the gas bypass path through the web member.

9. The heat conducting structure of claim 7, wherein the discharge limiting member and the outside member consist of a single piece of metal.

10. The heat conducting structure of claim 7, wherein the thin film of refractory ceramic covers a majority of areas on the surface the discharge limiting member that are exposed to gas discharge.

11. The heat conducting structure of claim 7, wherein the discharge limiting member comprises tungsten and the refractory ceramic comprises alumina.

12. A gas discharge tube for an ion laser, comprising:
a vacuum envelope having an axis and an inside surface;
a plurality of heat conducting structures secured to the inside surface of the vacuum envelope spaced along the axis of the vacuum envelope, for conducting heat out of the vacuum envelope;
wherein heat conducting structures in the plurality include a discharge limiting member, a shield member and a web member;
the web member having an outside perimeter and an inside perimeter, secured at its outside perimeter to the inside surface of the vacuum envelope and near its inside perimeter to the shield member, and having a plurality of passages providing a gas bypass path near the inside surface of the vacuum envelope;

the shield member having an outside perimeter and an inside perimeter, secured near its outside perimeter to the web member and near its inside perimeter to the discharge limiting member, and having a shield for isolating the gas bypass path through the web member from discharge along the axis of the vacuum envelope;

the discharge limiting member having an outside perimeter and an inner aperture, secured near its outside perimeter to the shield member, wherein the inner aperture limits gas discharge to a bore along the axis of the vacuum envelope; and a thin film of refractory ceramic coating at least a portion of the discharge limiting member that is exposed to gas discharge in the bore.

13. The gas discharge tube of claim 12, wherein the discharge limiting member, the shield member and the web member consist of a single piece of metal.

14. The gas discharge tube of claim 12, wherein the discharge limiting member comprises tungsten and the refractory ceramic comprises alumina.

* * * * *